(12) United States Patent
Ito et al.

(10) Patent No.: US 6,978,391 B2
(45) Date of Patent: Dec. 20, 2005

(54) ASYNCHRONOUS BUS INTERFACE CIRCUIT, METHOD OF CONTROLLING THE CIRCUIT, MICROCOMPUTER, AND DEVICE CONTROLLING METHOD

(75) Inventors: Kenichi Ito, Kanagawa (JP); Ryousaku Kobayashi, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 412 days.

(21) Appl. No.: 09/984,811

(22) Filed: Oct. 31, 2001

(65) Prior Publication Data

US 2002/0052998 A1 May 2, 2002

(30) Foreign Application Priority Data

Nov. 1, 2000 (JP) .............................. 2000-335012

(51) Int. Cl.$^7$ .............................................. G06F 1/12
(52) U.S. Cl. ...................................... 713/401; 710/107
(58) Field of Search ....................... 710/107, 110–115, 710/305, 306, 310, 116–118, 240, 241, 100, 710/309; 370/455; 711/147, 151; 713/400, 713/401

(56) References Cited

U.S. PATENT DOCUMENTS

| 5,047,921 A | * | 9/1991 | Kinter et al. | 711/147 |
| 5,598,542 A | * | 1/1997 | Leung | 710/117 |
| 5,949,789 A | * | 9/1999 | Davis et al. | 370/452 |
| 6,249,847 B1 | * | 6/2001 | Chin et al. | 711/151 |

FOREIGN PATENT DOCUMENTS

| JP | 49-53342 | 5/1974 |
| JP | 57-59243 | 4/1982 |
| JP | 57-182838 | 11/1982 |
| JP | 57-191749 | 11/1982 |
| JP | 60-160461 | 8/1985 |
| JP | 61-180357 | 8/1986 |
| JP | 64-9563 | 1/1989 |
| JP | 03-132857 | 6/1991 |
| JP | 05-197676 | 8/1993 |
| JP | 06-83768 | 3/1994 |
| JP | 11-73389 | 3/1999 |

OTHER PUBLICATIONS

Japanese Office Action dated Feb. 12, 2003, with partial English translation.

* cited by examiner

Primary Examiner—Rehana Perveen
Assistant Examiner—Clifford Knoll
(74) Attorney, Agent, or Firm—McGinn IP Law Group, PLLC.

(57) ABSTRACT

In microcomputers for being embedded into various devices, asynchronous bus interface circuits are arranged between an asynchronous bus and macro circuits, operating in synchronization with an operational clock. Each asynchronous bus interface circuit includes an external register, a synchronizing buffer, an arbitration circuit and an internal register. The external register stores data in response to a write-request signal from the bus. The synchronizing buffer receives this data from the external register and outputs the data in synchronization with the clock. The arbitration circuit outputs an internal register-write signal in synchronization with the clock, in response to the write-request signal. The internal register receives the data from the synchronizing buffer upon reception of the internal-register-write signal, and outputs the received data to the macro circuit in synchronization with the clock. Upon reception of the following write-request signal, the arbitration circuit suppresses the internal register-write signal corresponding to the preceding write-request signal.

19 Claims, 5 Drawing Sheets

FIG. 4

(a) INTERNAL REGISTER-WRITE SIGNAL GENERATING CYCLE
(b) EXTERNAL REGISTER-WRITE SIGNAL
(c) FLAG-CLEAR REQUEST SIGNAL
(d) WRITE-REQUEST FLAG SIGNAL
(e) INTERNAL SIGNAL 1 FOR GENERATING INTERNAL REGISTER WRITE SIGNAL
(f) INTERNAL SIGNAL 2 FOR GENERATING INTERNAL REGISTER-WRITE SIGNAL
(g) INTERNAL REGISTER-WRITE SIGNAL

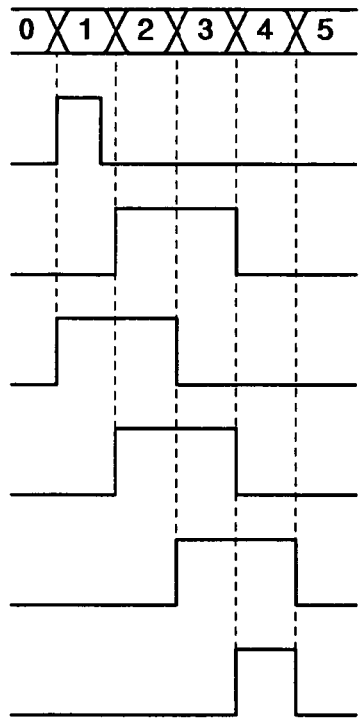

FIG. 5

(a) INTERNAL REGISTER-WRITE SIGNAL GENERATING CYCLE
(b) EXTERNAL REGISTER-WRITE SIGNAL
(c) FLAG-CLEAR REQUEST SIGNAL
(d) WRITE-REQUEST FLAG SIGNAL
(e) INTERNAL SIGNAL 1 FOR GENERATING INTERNAL REGISTER WRITE SIGNAL
(f) INTERNAL SIGNAL 2 FOR GENERATING INTERNAL REGISTER-WRITE SIGNAL
(g) INTERNAL REGISTER-WRITE SIGNAL

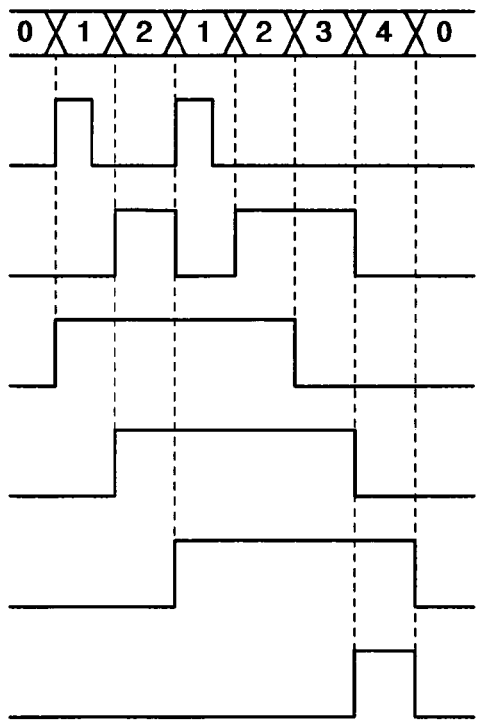

ASYNCHRONOUS BUS INTERFACE CIRCUIT, METHOD OF CONTROLLING THE CIRCUIT, MICROCOMPUTER, AND DEVICE CONTROLLING METHOD

BACKGROUND OF THE INVENTION

1. Field of the Invention

The present invention relates to an asynchronous bus interface circuit, and, more particularly, to an asynchronous bus interface circuit arranged between an asynchronous bus and a macro circuit in a microcomputer.

2. Description of the Related Art

Some microcomputers, for being embedded into various devices and controlling the devices, have the structure wherein an asynchronous bus connects a CPU performing operations and various macro circuits for controlling a target device. Each of the macro devices equips one of function blocks, such as an input/output control of the target device, into which various functions for controlling the target device are arranged. In recent years, in such an embedded microcomputer, the operational clock frequency of a macro circuit tends to be lowered so that the power consumption of the microcomputer can be decreased. If the operational clock frequency of the macro circuit is lowered, the conventional embedded microcomputer fails into a bus-wait state for a long time when the CPU transmits data to the macro circuit. Such a long bus-wait causes a lowering of the processing performance.

As a technique for overcoming the above problem, there is a embedded microcomputer comprising a CPU, an synchronous bus, a macro device and an asynchronous bus interface circuit arranged between the asynchronous bus and the macro circuit described below. The asynchronous bus interface circuit performs handshaking with a CPU through an asynchronous bus so as to store temporarily the received data from the CPU, output the temporarily stored data to the macro circuits in synchronization with an operational clock of the macro circuit. FIG. 6 is a block diagram showing the exemplary structure of such a microcomputer. As illustrated in FIG. 6, this microcomputer includes a CPU 51, an asynchronous bus 52, a plurality of macro circuits 53 and a plurality of asynchronous bus interface circuits 54. The CPU 51 is connects directly to the asynchronous bus 52, and each of the macro circuits 53 is connected to the asynchronous bus 52 respectively through the asynchronous bus interface circuits 54.

The asynchronous bus interface circuits 54 can input and output data to and from the asynchronous bus 52 and the respective macro circuits 53. The asynchronous bus interface circuits 54 receive an internal clock signal 60 respectively from the macro circuits 53. Each of the asynchronous bus interface circuits 54 includes an external register 55, an internal register 57 and an arbitration circuit 58. The external register 55 outputs data written thereinto from the CPU 51 through the asynchronous bus 52, to the internal register 57 in synchronization with the internal clock signal 60. The data output from the external register 55 is written into the internal register 57 in response to an internal register-write signal 59 to be output from the arbitration circuit 58. The internal register 57 outputs the written data to one of the macro circuits 53 in synchronization with the internal clock signal 60.

The arbitration circuit 58 includes, as illustrated in FIG. 7, an effective-data-signal generation circuit 61 and an internal register-write-signal generation circuit 62 both of which operate in synchronization with the internal clock signal 60.

Upon reception of an external register-write signal 63 output from the CPU 51 through the asynchronous bus 52, the effective-data-signal generation circuit 61 generates an external register-data request signal 65 in a disable state and an effective data signal 64. Then, the effective-data-signal generation circuit 61 outputs the effective data signal 64 and the external register-data request signal 65, respectively to the internal register-write-signal generation circuit 62 and the asynchronous bus 52. The CPU 51 receives the external register-data request signal 65 in a disable state through the asynchronous bus 52.

The effective data signal 64 and the external register-data request signal 65 are kept thereinto until data written into the external register 55 is for written into the internal register 57. Upon reception of the effective data signal 64, the internal register-write signal generation circuit 62 generates the internal register-write signal 59, and outputs the generated signal 59 to the internal register 57. In the structure where such an asynchronous bus interface circuit 54 is included in each of the microcomputers, the CPU 51 can output data regardless of the operational clock frequency of the macro circuits 53.

It should be mentioned, however, that it is forbidden to write new data into the external register while transmitting data from the external register to the internal register in each asynchronous bus interface circuit, in the above-described conventional microcomputer. Hence, in the case where data is written into the same macro circuit over and over, the CPU falls into a bus wait state, and hence lowering the processing performance of the microcomputer.

In the case where the conditions of a target device to be controlled dramatically change, it is necessary that the microcomputer always write new data to the macro circuit in accordance with the change in the conditions. Accordingly, a plurality of write requests for writing data to a single external register from the CPU may be transmitted. In this case, it is forbidden to write the latest data into the external register when intended to do so, the latest data necessary for controlling the target device can not be input to the macro circuit.

SUMMARY OF THE INVENTION

The present invention has been made in consideration of the above. It is accordingly an object of the present invention to provide an asynchronous bus interface circuit that does not lower the processing performance of a microcomputer even if an operational clock frequency of a macro circuit is lowered, in an embedded microcomputer having a CPU and a macro circuit operating in synchronization with an operational clock, which is coupled with the CPU through an asynchronous bus.

Another object thereof is to provide an asynchronous bus interlace circuit which can input the latest data into a macro circuit, even in the case where a plurality of requests are transmitted from a CPU to update the controlling conditions to be input to the macro circuit within a short period of time, for example, in the case where conditions of target device to be controlled dramatically change.

In order to achieve the above objects, according to the first aspect of the present invention, there is provided an asynchronous bus interface circuit which is arranged between an asynchronous bus and a macro circuit operating in synchronization with an operational clock, the interface circuit comprising:

an external register which temporarily stores data transmitted through the asynchronous bus, in response to a write-request signal transmitted through the asynchronous bus and outputs the stored data;

a synchronizing buffer which temporarily stores data output from the external register and outputs the data in synchronization with the operational clock;

an arbitration circuit which executes an internal register-write signal generating cycle in response to the write-request sign, the internal register-write signal generation cycle being for generating and outputting an internal register-write signal in synchronization with the operational clock; and an internal register which inputs and temporarily stores the data output from the synchronizing buffer in response to reception of the internal register-write signal output by the arbitration circuit, and outputs the temporarily stored data to the macro circuit in synchronization with the operational clock, wherein the arbitration circuit cancels the internal register-write signal generating cycle under execution, upon reception of the write-request signal.

According to this asynchronous bus interface circuit, even in the case where data is written into the same macro circuit over and over, the CPU can write data to the external register corresponding to this macro circuit through the asynchronous bus. Hence, the processing performance of a microcomputer employing this asynchronous bus interface circuit is not lowered, because the CPU will not be in a bus wait state. Further, in the case where the conditions of the target devices to be controlled by the microcomputer dramatically change, the latest data for updating the conditions of the target devices can be output to the macro circuits.

The arbitration circuit may include
  a request-flag set circuit which sets a write-request flag signal ON immediately upon reception of the write-request signal, and sets the write-request flag signal OFF in synchronization with the operational clock upon reception of a flag-clear request signal,
  a clear-signal generation circuit which sets the flag-clear request signal ON or OFF in synchronization with the operational clock, in accordance with an ON or OFF state of the write-request flag signal, and sets the flag-clear request signal OFF immediately upon reception of the write-request signal, and
  an internal register-write signal generation circuit which generates and outputs the internal register-write signal in synchronization with the operational clock, in accordance with an ON or OFF state of the write-request flag signal.

The internal register-write signal generation circuit may set the internal register-write signal ON in synchronization with the operational clock, in a case where the write-request flag signal is set OFF.

In order to achieve the above objects, according to the second aspect of the present invention, there is provided a method of controlling an asynchronous bus interface for coupling a macro circuit, operating in synchronization with an operational clock, to an asynchronous bus, the method comprising:

temporarily storing data transmitted through the asynchronous bus in response to a write-request signal transmitted through the asynchronous bus, in an external register, temporarily storing the data stored in the external register in a synchronizing buffer, outputting the data stored in the synchronizing buffer in synchronization with the operational clock;

executing an internal register-write signal generating cycle upon reception of the write-request signal, the internal register-write signal generating cycle being for generating and outputting an internal register-write signal in synchronization with the operational clock;

canceling the internal register-write signal generating cycle under execution upon reception of a new write-request signal, and executing the internal register-write signal generating cycle corresponding to the new write-request signal;

temporarily storing the data output from the synchronizing buffer in an internal register, in response to the internal register-write signal output at the internal register-write signal generating cycle; and outputting the data stored in the internal register in synchronization with the operational clock, to the macro circuit.

According to this asynchronous bus interface control method, even in the case where data is written into the same macro circuit over and over, the CPU can write data to the external register corresponding to this macro circuit through the asynchronous bus. Hence, the processing performance of a microcomputer employing this asynchronous bus interface control method is not lowered, because the CPU will not be in a bus wait state. Further, in the case where the conditions of the target devices to be controlled by the microcomputer dramatically change, the latest data for updating the conditions of the target devices can be output to the macro circuits.

In order to achieve the above objects, according to the third aspect of the present invention, there is provided a microcomputer comprising an asynchronous bus, a CPU connected to the asynchronous bus, a macro circuit operating in synchronization with an operational clock, and an asynchronous bus interface circuit connected to the asynchronous bus and the macro circuit, wherein the asynchronous bus interface circuit includes an external register which receives a write-request signal output by the CPU through the asynchronous bus, receives and temporarily stores data output by the CPU through the synchronous bus in response to the received write-request signal, and outputs the temporarily stored data, a synchronizing buffer which temporarily stores the data output from the external register, and outputs the data in synchronization with the operational clock of the macro circuit, a arbitration circuit which executes an internal register-write signal generating cycle in response to the write-request signal the internal register-write signal generating cycle being for generating and outputting an internal register-write signal in synchronization with the operational clock of the macro circuit, and cancels the internal register-write signal generating cycle under execution upon reception of the write-request signal and an internal register which inputs and temporarily stores data output from the synchronizing buffer in response to the internal register-write signal output by the arbitration circuit, and outputs the data to the macro circuit in synchronization with the operational clock of the macro circuit.

According to this microcomputer, even in the case where data is written into the same macro circuit over and over, the CPU can write data to the external register corresponding to this macro circuit through the asynchronous bus. Hence, the processing performance of the microcomputer is not lowered, because the CPU will not be in a bus wait state. Further, in the case where the conditions of the target devices to be controlled by the microcomputer dramatically change, the latest data for updating the conditions of the target devices can be output to the macro circuit.

In order to achieve the above objects, according to the fourth aspect of the present invention, there is provided an embedded microcomputer for being embedded into target devices to be controlled, and controlling operations of the target devices, the embedded microcomputer comprising:

an asynchronous bus;

a CPU connected to the asynchronous bus;

a macro circuit which operates in synchronization with an operational clock and controls the operations of the target devices based on data output by the CPU; and an asynchronous bus interface circuit which is connected to each of the asynchronous bus and the macro circuit;

wherein the asynchronous bus interface circuit includes an external register which receives a write-request signal output by the CPU through the asynchronous bus, receives and temporarily stores data output by the CPU through the asynchronous bus in response to the received write-request signal, and outputs the stored data, a synchronizing buffer which temporarily stores data output from the external register, and outputs the stored data in synchronization with an operational clock of the macro circuit, an arbitration circuit which executes an internal register-write signal generating cycle in response to the write-request signal, the internal register-write signal generating cycle being for generating and outputting an internal register-write signal in synchronization with the operational clock of the macro circuit, and cancels the internal register-write signal generating cycle under execution upon reception of the write-request signal, and an internal register which inputs and temporarily stores data output from the synchronizing buffer in response to the internal register-write signal output by the arbitration circuit, and outputs the stored data to the macro circuit in synchronization with the operational clock of the macro circuit.

According to this embedded microcomputer, even in the case where data is written into the same macro circuit over and over, the CPU can write data to the external register corresponding to this macro circuit through the asynchronous bus. Hence, the processing performance of the embedded microcomputer is not lowered, because the CPU will not be in a bus wait state. Further, in the case where the conditions of the target devices to be controlled by the embedded microcomputer dramatically change, the latest data for updating the conditions of the target devices can be output to the macro circuits.

In order to achieve the above objects, according to the fifth aspect of the present invention, there is provided a device controlling method employed in a microcomputer comprising an asynchronous bus, a CPU connected to the asynchronous bus, and a macro circuit coupled to the asynchronous bus and operating in synchronization with an operational clock, and the method comprising:

outputting data created by the CPU to control a target device to be controlled and also a write-request signal for the created data, to the asynchronous bus;

temporarily storing the data output to the asynchronous bus in an external register, according to the write-request signal output to the asynchronous bus;

temporarily storing the data stored in the external register in a synchronizing buffer, outputting the data stored in the synchronizing buffer in synchronization with the operational clock of the macro circuit;

executing an internal register-write signal generating cycle in response to the write-request signal, the internal register-write signal generating cycle being for generating and outputting an internal register-write signal in synchronization with the operational clock of the macro circuit, and cancels the internal register-write signal generating cycle under execution upon reception of the write-request signal, canceling the internal register-write signal generating cycle execution in response to a new write-request signal and executing the internal register-write signal generating cycle corresponding to the new write-request signal temporarily storing the data output from the synchronizing buffer in an internal register, in response to the internal register-write signal to output at the internal register-write signal generating cycle;

outputting the data stored in the internal register to the macro circuit in synchronization with the operational clock of the macro circuit; and controlling the target device to be controlled base on the data received in synchronization with the operational clock in the macro circuit.

According to this method, even in the case where data is written into tie same macro circuit over and over, the CPU can write data to the external register corresponding to this macro circuit through the asynchronous bus. Hence, the processing performance of a microcomputer employing this method is not lowered, because the CPU will not be in a bus wait state. Further, in the cause where the conditions of the target devices to be controlled by the microcomputer dramatically change, the latest data for updating the conditions of the target devices can be output to the macro circuits.

BRIEF DESCRIPTION OF THE DRAWINGS

These objects and other objects and advantages of the present invention will become more apparent upon reading of the following detailed description and the accompanying drawings in which:

FIG. 4 is a ting chart of the arbitration circuit in the case where no succeeding write request is transmitted;

FIG. 5 is a timing chart of the arbitration Circuit in the case where a succeeding write request is transmitted;

DETAILED DESCRIPTION OF THE PREFERRED EMBODIMENT

A preferred embodiment of the present invention will now be described with reference to the accompanying drawings.

Figure 1:
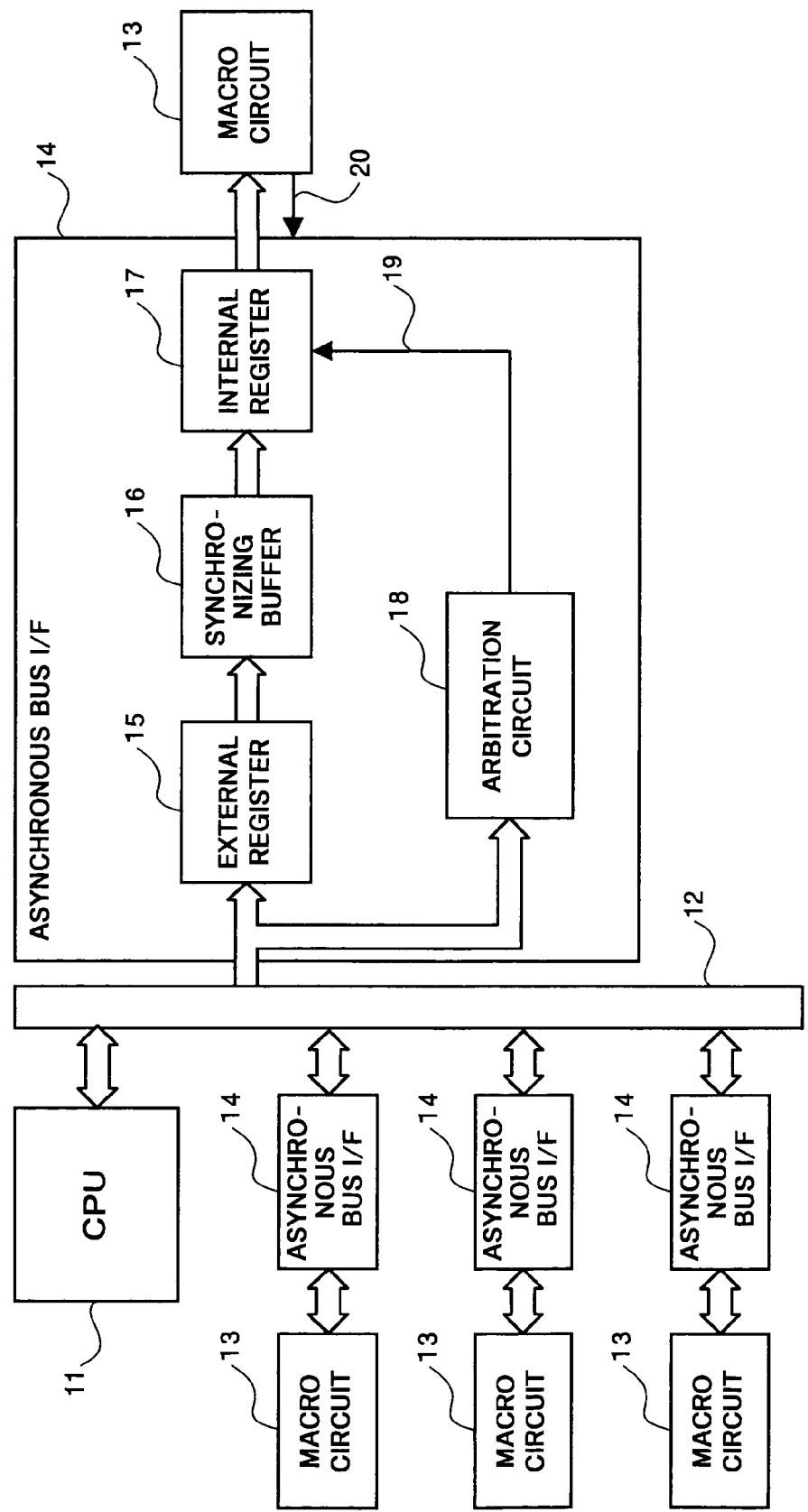
FIG. 1 is a diagram showing the structure of a microcomputer having an asynchronous bus interface circuit according to an embodiment of the present invention.

FIG. 1 is a block diagram showing the structure of a microcomputer having an asynchronous bus interface circuit according to the embodiment of the present invention. In FIG. 1, the microcomputer includes a CPU (Central. Processing Unit) 11, an asynchronous bus 12, a plurality of macro circuits 13 and a plurality of asynchronous bus interface circuits 14. The CPU 11 is connected directly to the asynchronous bus 12, whereas the macro circuits 13 are coupled to the asynchronous bus 12 through the asynchronous bus interface circuits 14, respectively.

The CPU 11 is a processor that executes operation instructions in this microcomputer and controls the entire operations of the microcomputer. The CPU 11 sends and receives data to and from each of the macro circuits 13 through the asynchronous bus 12. At this time, the CPU 11 sends control data required for a corresponding control cycle of each of the macro circuits 13 at one bus access. The CPU 11 sends new control data, in the case where the conditions of a target device to be controlled change before the macro circuit 13 controls the device based on data previously transmitted.

The asynchronous bus 12 is a transmission path for transferring data, and includes an address/data line and a handshaking signal line. The asynchronous bus 12 handles data communications between a sender and a receiver on the bus 12, in accordance with the handshake protocol. This asynchronous bus 12 has such a bus width that instructions or data sent from the CPU 11 to the macro circuits 13 can be transferred at one access. Each of the macro circuits 13 is semiconductor circuit that equips one of function blocks, such as an input/output control of the target device, into which various functions for controlling the target device are arranged.

The asynchronous bus interface circuits 14 can input and output data to and from the asynchronous bus 12 and the macro circuits 13. An internal clock signal 20 is input from each of the macro circuits 13 to the corresponding asynchronous bus interface circuit 14, The systematic structure of signals output from the macro circuits 13 to the asynchronous bus 12 will neither be described in this specification nor illustrated in the drawings, because it has nothing to do with the structure of the present invention. Instead, the systematic structure of signals output from the asynchronous bus 12 to the macro circuits 13 will be explained later. As illustrated in FIG. 1, each of the asynchronous bus interface circuits 14 has an external register 15, a synchronizing buffer 16, an internal register 17 and an arbitration circuit 18.

The input side of the external register 15 is connected to the asynchronous bus 12, and the output side thereof is connected to the input side of the synchronizing buffer 16. The input side of the synchronizing buffer 16 is connected to all of the output side of the external register 15, the output side (not illustrated) of the asynchronous bus 12 and the internal clock signal 20 (not illustrated). The output side of the synchronizing buffer 16 is connected to the input side of the internal register 17. The input side of the internal register 17 is connected to all of the output side of the synchronizing buffer 16, an internal register-write signal 19, and the internal clock signal 20, and the output side thereof is connected to the input side of the corresponding macro circuit 13. The input side of the arbitration circuit 18 is connected to the asynchronous bus 12 and the internal clock signal 20. The internal register-write signal 19 output from the arbitration circuit 18 is connected to the input side of the internal register 17.

To be exact, the circuits are connected to the signal lines for the various signals, for example the internal register-write signal 19. However, the signal transmitted on tie signal lines is identified with the signal lines in the specification.

The external register 15 is a register to which data can be written from the CPU 11 through the asynchronous bus 12. The CPU 11 can write data to the external register 15 without being in a wait state, using an external register write signal 24, which is a signal transmitted through the asynchronous bus 12. Data written to the external register 15 is kept in the external register 15 until further data is to be written thereto and output to the external register 15. The synchronizing buffer 16 reads and keeps the data output from the external register 15, and outputs this data to the internal register 17 in synchronization with the internal clock signal 20. Only when the internal register-write signal 19 is input, the internal register 17 receives and keeps the data output by the synchronizing buffer 16. Then, the internal register 17 outputs the received data to the macro circuit 13 in synchronization with the internal clock signal 20.

In response to the above external register-write signal 24, the arbitration circuit 18 begins an internal register-write signal generating cycle in synchronization with the internal clock signal 20, so as to generate the internal register-write signal 19, and output the generated internal register-write signal 19 to the internal register 17. Operations of the arbitration circuit 18 will now be explained with reference to FIG. 2.

Figure 2:
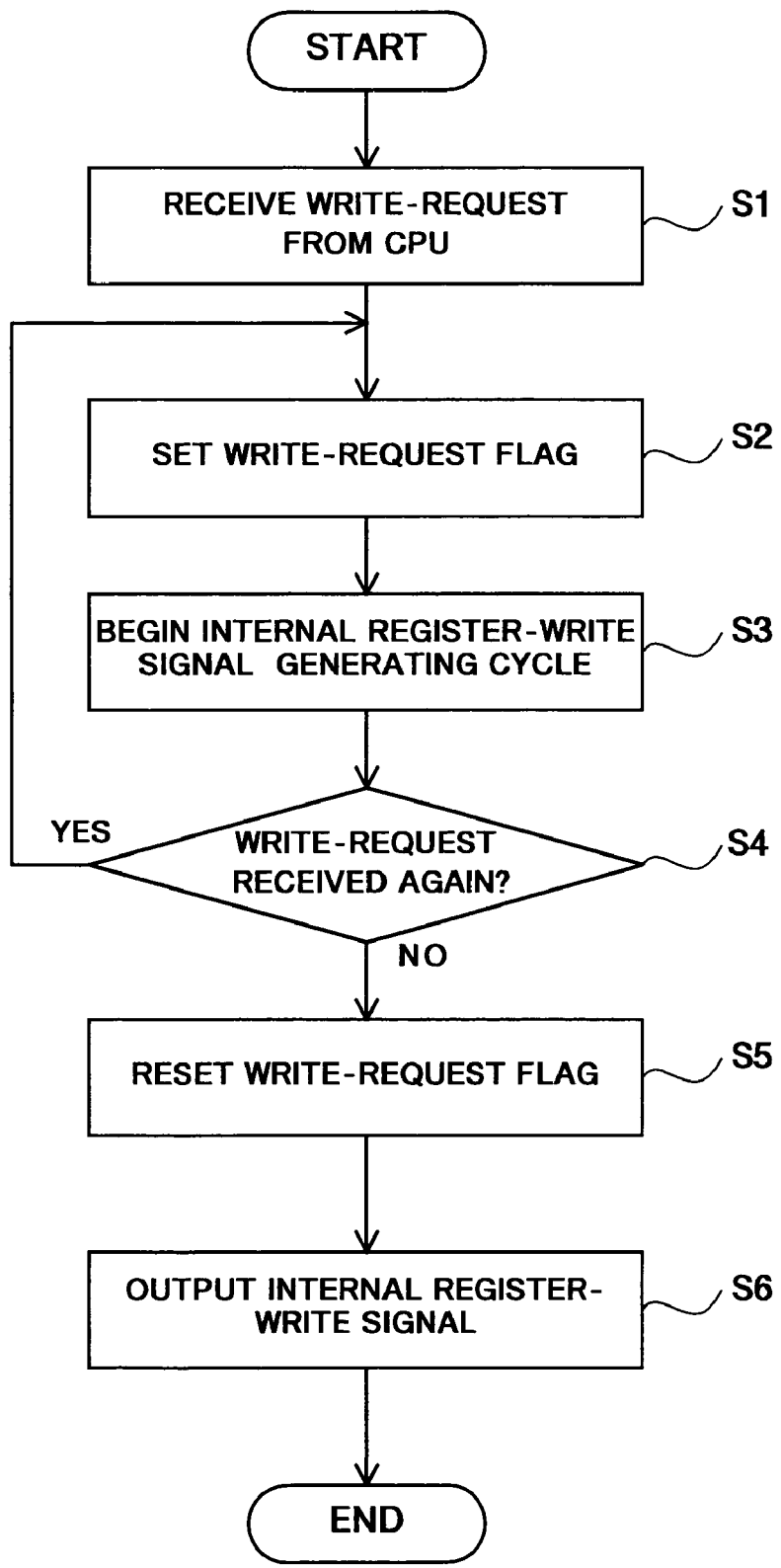
FIG. 2 is a flowchart showing operations of a arbitration circuit shown in FIG. 1.

FIG. 2 is a flowchart showing operations of the arbitration circuit 12. Upon reception of the external register-write signal 24 as a request for writing data from the CPU 11 (Step S1), the arbitration circuit is sets a write-request flag (Step S2), and begins the internal register-write signal generating cycle in synchronization with the internal clock signal 20 (Step S3).

After the arbitration circuit 18 begins the internal register-write signal generating cycle, it checks whether the external register-write signal. 24 has been transmitted again from the CPU (Step S4).

In the case where the external register-write signal 24 has been transmitted again, the arbitration circuit 18 cancels the internal register-write signal generating cycle under execution, and returns to the procedure of the step S2. Then, the arbitration circuit 18 resets the write-request flag, and begins the internal register-write signal generating cycle corresponding to a new external register-write signal 24, In the case where the external register-write signal 24 has not been transmitted again in the step S4, the arbitration circuit 18 resets the write-request flag (Step S5). Then, the arbitration circuit 18 outputs the internal register-write signal 19 to the internal register 17 in synchronization with the internal clock signal 20 so as to cause the internal register 17 to retrieve data (Step S6).

Figure 3:
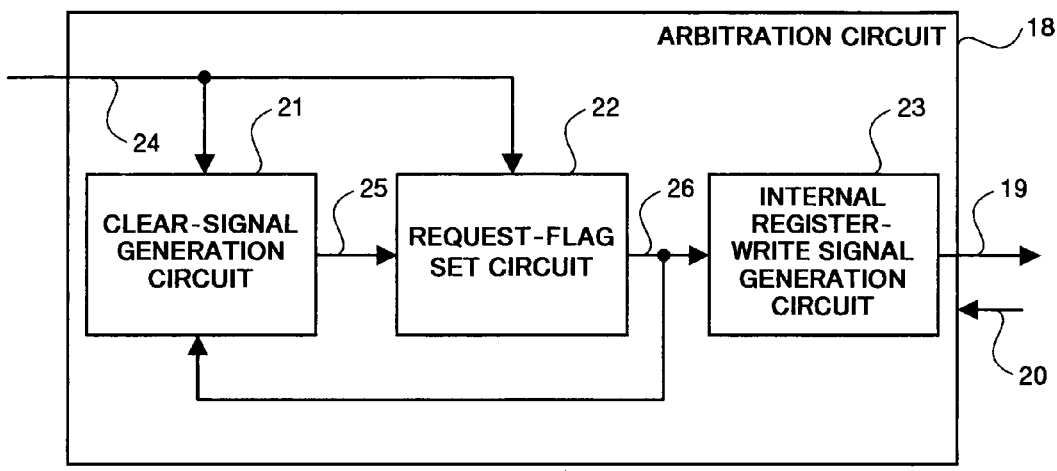
FIG. 3 is a block diagram showing the structure of the arbitration circuit.
Figure 7:
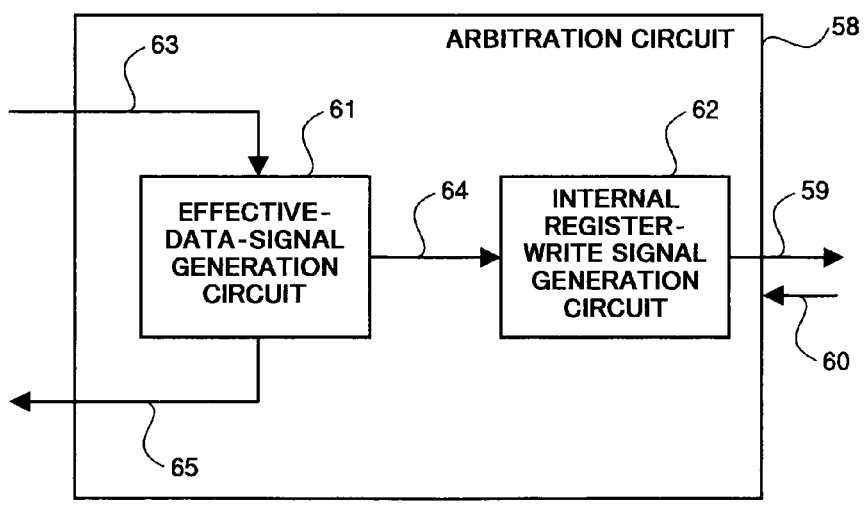
FIG. 7 is a block diagram showing the structure of a arbitration circuit shown in FIG. 6.
Figure 6:
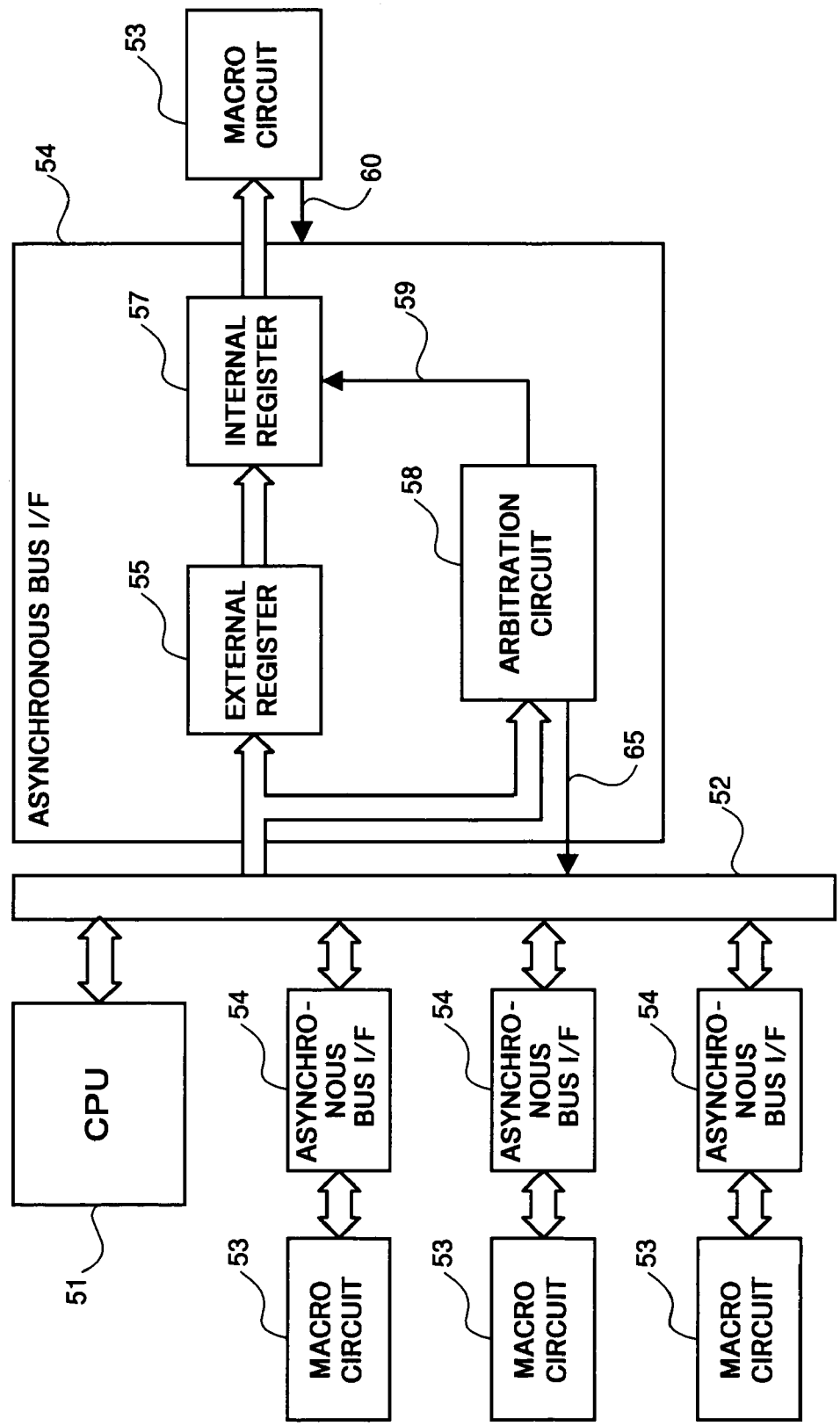
FIG. 6 is a block diagram showing the structure of a microcomputer having a conventional asynchronous bus interface circuit.

The exemplary structure of the arbitration circuit 18 will now be described with reference to FIG. 3. FIG. 3 is a block diagram showing the exemplary ,structure of the arbitration circuit 18. As illustrated in FIG. 3, the arbitration circuit 18 comprises a clear-signal generation circuit 21, a request-flag set circuit 22, and an internal register-write signal generation circuit 23. The internal clock signal 20 supplied from each of the macro circuits 13 to the corresponding asynchronous bus interface circuit 14 is input to the arbitration circuit of the asynchronous bus interface circuit 14, and then supplied to each circuit included in the arbitration circuit 18.

The clear-signal generation circuit 21 inputs the external register-write signal 24, a write-request flag signal 26, and the internal clock signal 20, and outputs a flag-clear request signal 25. The clear-signal generation circuit 21 sets the flag-clear request signal 25 at a high level in synchronization with the internal clock signal 20, when a write-request flag signal 26 is at a high level. The clear-signal generation circuit 21 sets the flag-clear request signal 25 at a low level in synchronization with the internal clock signal when the write-request flag signal 26 is at a low level. The clear-signal generation circuit 21 sets the flag-clear request signal 25 at a low level upon rising of the external register-write signal 24 regardless of the internal clock signal 20.

The request-flag set circuit 22 inputs the external register-write signal 24, the flag-clear request signal 25 and the internal clock signal 20, and outputs the write-request flag signal 26. The request-flag set circuit 22 sets the write-request flag signal 26 at a high level upon rising of the external register-write signal 24 regardless of the internal clock signal 20. When the flag-clear request signal 25 is at a high level, the request-flag set circuit 22 sets the write-request flag signal 26 at a low level in synchronization with the internal clock signal 20.

The internal register-write signal generation circuit 23 inputs the write-request flag signal 26 and the internal clock signal, and outputs the internal register-write signal 19. To control the timing of the internal register-write signal, the internal register-write signal generation circuit 23 generates an internal signal 1 for generating an internal register-write signal and an internal signal 2 for generating an internal register-write signal. When the write-request flag signal 26 is at a high level, the internal register-write signal generation circuit 23 sets the internal signal 1 at a high level in synchronization with the internal clock signal 20. When the write-request flag signal 26 is at a low level, the internal register-write signal generation circuit 23 sets the internal signal 1 at a low level. When the internal signal 1 is at a high level, the internal register-write signal generation circuit 23 sets the internal signal 2 at a high level in synchronization with the internal clock signal 20. When the internal signal 1 is at a low level, the internal register-write signal generation circuit 23 sets the internal signal 2 at a low level in synchronization with the internal clock signal 20. The internal register-write signal generation circuit 23 sets the internal register-write signal 19 at a high level upon falling of the internal signal 1, and sets the internal register-write signal 19 at a low level upon falling of the internal signal 2.

Operations of the arbitration circuit 18 will now be explained with reference to FIGS. 4 and 5. FIGS. 4 and 5 are timing charts of the arbitration circuit 18. Particularly, FIG. 4 shows a state of the arbitration circuit 18 when there is no succeeding write request, and FIG. 5 shows a state of the arbitration circuit 18 when there is a succeeding write request. In FIGS. 4 and 5, (a) a cycle for generating an internal register-write signal, (b) the external register-write signal 24, (c) the flag-clear request signal 25, (d) the write-request flag signal 26, (e) and (f) respectively internal signals for generating the internal register-write signal 19 to be generated inside the internal register-write signal generation circuit 23, and (g) the internal register-write signal 19 are shown.

Case 1: In case where there is no succeeding write request

If the external register-write signal 24 is input within a signal holding cycle (Cycle 0), the request-flag set circuit 22 detects the rising edge of the external register-write signal 24 and sets the write-request flag signal 26 at a high level (Cycle 1).

The clear-signal generation circuit 21 and the internal register-write signal generation circuit 23 detect the high level of the write-request flag signal 26 in synchronization with the internal clock signal 20. Then, the clear-signal generation circuit 21 sets the flag-clear request signal 25 at a high level, while the internal register-write signal generation circuit 23 sets the internal signal 1 at a high level (Cycle 2).

The request-flag set circuit 22 detects the high level of the flag-clear request signal 25 in synchronizing on with the internal clock signal 20, and sets the write-request flag signal 26 at a low level. The internal register-write signal generation circuit 23 detects the high level of the internal signal 1 in synchronization with the internal clock signal 20, and sets the internal signal 2 at a high level (Cycle 3).

Each of the clear-signal generation circuit 21 and the internal register-write signal generation circuit 23 detects the low level of the write-request flag signal 26 in synchronization with the internal clock signal 20. Then, the clear-signal generation circuit 21 sets the flag-clear request signal 25 at a low level, while the internal register-write signal generation circuit 23 sets the internal signal 1 at a low level. Further, the internal register-write signal generation circuit 23 detects the falling edge of the internal signal 1, and sets the internal register-write signal 19 at a high level (Cycle 4).

The internal register-write sisal generation circuit 23 detects the low level of the internal signal 1 in synchronization with the internal clock signal 20, and sets the internal signal 2 at a low level. Further, the internal register-write signal generation circuit 23 detects the falling edge of the internal signal 2, sets the internal register-write signal 19 at a low level, and returns to the signal holding cycle (Cycle 0).

Case 2: In case where there is succeeding write request

If the external register-write signal 24 is input within the signal holding cycle (Cycle 0), the request-flag set circuit 22 detects the rising edge of the external register-write signal 24, and sets the write-request flag signal 26 at a high level (Cycle 1).

Each of the clear-signal generation circuit 21 and the internal register-write signal generation circuit 23 detects the high level of the write-request flag signal 26 in synchronization with the internal clock signal 20. Then, the clear-signal generation circuit 21 sets the flag-clear request signal 25 at a high level, while the internal register-write signal generation circuit 23 sets the internal signal 1 at a high level (Cycle 2).

If the external register-write signal 24 is input to the arbitration circuit 18 again, each of the request-flag set circuit 22 and the clear-signal generation circuit 21 detects the rising edge of the external register-write signal 24. Then, the new external register-write signal 24 causes the request-flag set circuit 22 to maintain the write-request flag signal 26 at a high level, while the clear-signal generation circuit 21 sets the flag-clear request signal 25 at a low level, and hence returning to the cycle 1. After this, every time the external register-write signal 24 is input to the arbitration circuit 18, the procedure returns to the cycle 1. On the contrary, in the case where external register-write signal 24 is not input to the arbitration circuit 18 again, the procedures in the case 1 (In case where there is no succeeding write request) advances to the cycles 2, 3, 4 and 0, as shown in FIG. 5.

According to the embodiment of the present invention, the synchronizing buffer 16 is arranged between the external register 15 and the internal register 17, the data written into the external register 15 is kept in the synchronizing buffer 16, and the kept data is written into the internal register 17 from the synchronizing buffer 16. Hence, data can be written into the external register 15 while data is written into the internal register 17, and the CPU it can not be in a bus-wait state. Therefore, the processing performance of the microcomputer will not be lowered even if the operational clock frequency of the macro circuits 13 is decreased. In the case where the CPU 11 requests for another data transmission before writing the received data into the internal register 17, the arbitration circuit 18 controls the previous data not to be written into the internal register 17. Thus, the macro circuits 13 can controls a target device to be controlled based on the updated data.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-335012 filed on Nov. 1, 2000, and including specification, claims, drawings and summary. The priority of the above Japanese Patent Application is claimed.

What is claimed is:

1. An asynchronous bus interface circuit adapted to be arranged between an asynchronous bus and a macro circuit operating in synchronization with an operational clock, said interface circuit comprising:
    an external register for temporarily storing data transmitted through said asynchronous bus, in response to a write-request signal transmitted through said asynchronous bus, and outputting the stored data;
    a synchronizing buffer for temporarily storing data output from said external register, and outputting the data in synchronization with the operational clock;
    an arbitration circuit for initiating an internal register-write signal generating cycle in response to the write-request signal, the internal register-write signal generating cycle causing generating and outputting of an internal register-write signal in synchronization with the operational clock; and
    an internal register for inputting and temporarily storing the data output from said synchronizing buffer in response to the internal register-write signal, and outputting the data to the macro circuit in synchronization with the operational clock,
    wherein said arbitration circuit cancels an internal register-write signal generating cycle under execution without outputting the internal register-write signal, upon reception of a second write-request signal.

2. The asynchronous bus interface circuit according to claim 1, wherein said arbitration circuit comprises:
    a request-flag set circuit for setting a write-request flag signal ON immediately upon reception of the write-request signal, and setting the write-request flag signal OFF in synchronization with the operational clock when a flag-clear request signal is ON,
    a clear-signal generation circuit for (a) setting the flag-clear request signal ON in synchronization with the operational clock when the write-request flag signal is ON, (b) setting the flag-clear request signal OFF in synchronization with the operational clock when the write-request flag signal is OFF, and (c) setting the flag-clear request signal OFF immediately upon reception of the write-request signal, and
    an internal register-write signal generation circuit for generating and outputting the internal register-write signal in synchronization with the operational clock when the write-request flag signal has been ON and then has turned OFF.

3. The asynchronous bus interface circuit according to claim 2, wherein said internal register-write signal generation circuit sets the internal register-write signal ON in synchronization with the operational clock when the write-request flag signal is OFF.

4. An asynchronous bus interface circuit adapted to be arranged between an asynchronous bus and a macro circuit operating in synchronization with an operational clock, said interface circuit comprising:
    an external register for temporarily storing data transmitted through said asynchronous request flag signal has been ON and then has turned OFF,
    said arbitration circuit cancels an internal register-write signal generating cycle under execution upon reception of a second write-request signal, and
    said internal register-write signal generation circuit:
        sets a first internal signal in synchronization with the operational clock when the write-request flag signal is ON,
        sets a second internal signal in synchronization with the operational clock when the first internal signal is ON, and
        sets the internal register-write signal ON upon a falling transition of the first internal signal to OFF, and sets the internal register-write signal OFF upon a falling transition of the second internal signal to OFF.

5. A method of controlling an asynchronous bus interface for coupling a macro circuit, operating in synchronization with an operational clock, to an asynchronous bus, said method comprising:
    temporarily storing, in an external register, data transmitted through the asynchronous bus in response to a write-request signal transmitted through the asynchronous bus;
    temporarily storing, in a synchronizing buffer, the data stored in said external register;
    outputting the data from the synchronizing buffer in synchronization with the operational clock;
    initiating execution of an internal register-write signal generating cycle upon reception of the write-request signal, said internal register-write signal generating cycle causing bus, in response to a write-request signal transmitted through said asynchronous bus, and outputting the stored data;
    a synchronizing buffer for temporarily storing data output from said external register, and outputting the data in synchronization with the operational clock;
    an arbitration circuit for initiating an internal register-write signal generating cycle in response to the write-request signal, the internal register-write signal generating cycle causing generating and outputting of an internal register-write signal in synchronization with the operational clock; and
    an internal register for inputting and temporarily storing the data output from said synchronizing buffer in response to the internal register-write signal, and outputting the data to the macro circuit in synchronization with the operational clock, wherein:
    said arbitration circuit comprises:
        a request-flag set circuit for setting a write-request flag signal ON immediately upon reception of the write-request signal, and setting the write-request flag signal OFF in synchronization with the operational clock upon reception of a flag-clear request signal,
        a clear-signal generation circuit for (a) setting the flag-clear request signal ON in synchronization with the operational clock when the write-request flag signal is ON, (b) setting the flag-clear request signal OFF in synchronization with the operational clock when the write-request flag signal is OFF, and (c) setting the flag-clear request signal OFF immediately upon reception of the write-request signal, and an internal register-write signal generation circuit for generating and outputting the internal register-write signal in synchronization with the operational clock when the write-generating and outputting of an internal register-write signal in synchronization with the operational clock;

canceling an internal register-write signal generating cycle under execution without outputting the internal register write signal, upon reception of a new write-request signal;

initiating execution of a new internal register-write signal generating cycle in response to the new write-request signal;

temporarily storing the data output from the synchronizing buffer in an internal register, in response to the internal register-write signal; and outputting to the macro circuit the data stored in said internal register in synchronization with the operational clock.

6. A method of controlling an asynchronous bus interface for coupling a macro circuit, operating in synchronization with an operational clock, to an asynchronous bus, said method comprising:

temporarily storing, in an external register, data transmitted through the asynchronous bus in response to a write-request signal transmitted through the asynchronous bus;

temporarily storing, in a synchronizing buffer, the data stored in said external register;

outputting the data from the synchronizing buffer in synchronization with the operational clock;

initiating execution of an internal register-write signal generating cycle upon reception of the write-request signal, said internal register-write signal generating cycle causing generating and outputting of an internal register-write signal in synchronization with the operational clock;

canceling an internal register-write signal generating cycle under execution upon reception of a new write-request signal;

initiating execution of a new internal register-write signal generating cycle in response to the new write-request signal;

temporarily storing the data output from the synchronizing buffer in an internal register, in response to the internal register-write signal;

outputting to the macro circuit the data stored in said internal register in synchronization with the operational clock;

setting a write-request flag signal ON and a flag-clear request signal OFF immediately upon reception of the write-request signal;

setting the flag-clear request signal ON in synchronization with the operational clock, when the write-request flag signal is ON;

setting the write-request flag signal OFF in synchronization with the operational clock, when the flag-clear request signal is ON; and setting the flag-clear request signal OFF in synchronization with the operational clock, when the write-request flag signal is OFF.

7. A microcomputer comprising an asynchronous bus, a CPU connected to said asynchronous bus, a macro circuit adapted for operating in synchronization with an operational clock, and an asynchronous bus interface circuit connected to said asynchronous bus and said macro circuit, wherein said asynchronous bus interface circuit comprises:

an external register for receiving a write-request signal output by said CPU through said asynchronous bus, receiving and temporarily storing data output by said CPU through the synchronous bus in response to the received write-request signal, and outputting the temporarily stored data, a synchronizing buffer for temporarily storing the data output from said external register, and outputting the data in synchronization with the operational clock, an arbitration circuit for initiating an internal register-write signal generating cycle in response to the write-request signal, the internal register-write signal generating cycle causing generating and outputting of an internal register-write signal in synchronization with the operational clock, and canceling an internal register-write signal generating cycle under execution without outputting the internal register-write signal, upon reception of a second write-request signal, and an internal register for inputting and temporarily storing data output from said synchronizing buffer in response to the internal register-write signal output by said arbitration circuit, and outputting the data to the macro circuit in synchronization with the operational clock.

8. The microcomputer according to claim 7, wherein said arbitration circuit includes:

a request-flag set circuit for setting a write-request flag signal ON immediately upon reception of the write-request signal, and setting the write-request flag signal OFF in synchronization with the operational clock when a flag-clear request signal is ON, a clear-signal generation circuit for setting the flag-clear request signal ON in synchronization with the operational clock when the write-request flag signal is ON, setting the flag-clear request signal OFF in synchronization with the operational clock when the write-request signal is OFF, and setting the flag-clear request signal OFF immediately upon reception of the write-request signal, and an internal register-write signal generation circuit for generating and outputting the internal register-write signal in synchronization with the operational clock when the write-request flag signal has been ON and then turns OFF.

9. The microcomputer according to claim 8, wherein said internal register-write signal generation circuit sets the internal register-write signal ON in synchronization with the operational clock when the write-request flag signal is OFF.

10. An embedded microcomputer for being embedded into a target device to be controlled, to control operations of the target device, said embedded microcomputer comprising:

an asynchronous bus;

a CPU connected to said asynchronous bus;

a macro circuit for operating in synchronization with an operational clock and controlling the operations of the target device based on data output by said CPU; and an asynchronous bus interface circuit connected to said asynchronous bus and said macro circuit;

wherein said asynchronous bus interface circuit comprises:

an external register for receiving a write-request signal output by said CPU through the asynchronous bus, receiving and temporarily storing data output by said CPU through said asynchronous bus in response to the received write-request signal, and outputting the stored data, a synchronizing buffer for temporarily storing data output from said external register, and outputting the data in synchronization with the operational clock, an arbitration circuit for initiating an internal register-write signal generating cycle in response to the write-request signal, the internal register-write signal generating cycle causing generating and outputting of an internal register-write signal in synchronization with the operational clock, and canceling an internal register-write signal generating cycle under execution without outputting the internal register-write signal, upon reception of a second write-request signal, and an internal register for inputting and temporarily storing data output from said synchronizing buffer in response to the internal register-write signal output by said arbitration circuit, and outputting the stored data to said macro circuit in synchronization with the operational clock.

11. The embedded microcomputer according to claim 10, wherein said arbitration circuit comprises:

a request-flag set circuit for setting a write-request flag signal ON immediately upon reception of the write-request signal, and setting the write-request flag signal OFF in synchronization with the operational clock when a flag-clear request signal is ON, a clear-signal generation circuit for setting the flag-clear request signal ON in synchronization with the operational clock when the write-request flag signal is ON, setting the flag-clear request signal OFF in synchronization with the operational clock when the write-request signal is OFF, and setting the flag-clear request signal OFF immediately upon reception of the write-request signal, and an internal register-write signal generation circuit for generating and outputting the internal register-write signal in synchronization with the operational clock when the write-request flag signal has been ON and then has turned OFF.

12. The embedded microcomputer according to claim 10, wherein:

said internal register-write signal generation circuit sets the internal register-write signal ON in synchronization with the operational clock when the write-request flag signal is OFF.

13. A device controlling method employed in a microcomputer comprising an asynchronous bus, a CPU connected to said asynchronous bus, and a macro circuit coupled to said asynchronous bus and operating in synchronization with an operational clock, said method comprising:

outputting data created by said CPU to control a target device and outputting to said asynchronous bus a write-request signal for the created data;

temporarily storing the data output to said asynchronous bus in an external register, according to the write-request signal output to said asynchronous bus;

temporarily storing, in a synchronizing buffer, the data stored in said external register; outputting the data stored in said synchronizing buffer in synchronization with the operational clock;

initiating execution of an internal register-write signal generating cycle in response to the write-request signal, said internal register-write signal generating cycle causing generating and outputting of an internal register-write signal in synchronization with the operational clock, canceling the internal register write signal generating cycle without outputting the internal register-write signal, in response to a new write request signal, initiating execution of a new internal register-write signal generating cycle corresponding to the new write-request signal, temporarily storing the data output from said synchronizing buffer in an internal register, in response to the internal register-write signal output at the internal register-write signal generating cycle;

outputting the data stored in said internal register to said macro circuit in synchronization with the operational clock; and controlling the target device based on the data received in synchronization with the operational clock.

14. A device controlling method employed in a microcomputer comprising an asynchronous bus, a CPU connected to said asynchronous bus, and a macro circuit coupled to said asynchronous bus and operating in synchronization with an operational clock, said method comprising:

outputting data created by said CPU to control a target device and outputting to said asynchronous bus a write-request signal for the created data;

temporarily storing the data output to said asynchronous bus in an external register, according to the write-request signal output to said asynchronous bus;

temporarily storing, in a synchronizing buffer, the data stored in said external register;

outputting the data stored in said synchronizing buffer in synchronization with the operational clock;

initiating execution of an internal register-write signal generating cycle in response to the write-request signal, said internal register-write signal generating cycle causing generating and outputting of an internal register-write signal in synchronization with the operational clock, canceling the internal register write signal generating cycle in response to a new write request signal, initiating execution of a new internal register-write signal generating cycle corresponding to the new write-request signal, temporarily storing the data output from said synchronizing buffer in an internal register, in response to the internal register-write signal output at the internal register-write signal generating cycle;

outputting the data stored in said internal register to said macro circuit in synchronization with the operational clock;

controlling the target device based on the data received in synchronization with the operational clock;

setting a write-request flag signal ON and a flag-clear request signal OFF immediately upon reception of the write-request signal;

setting the flag-clear request signal ON in synchronization with the operational clock when the write-request flag signal is ON;

setting the write-request flag signal OFF in synchronization with the operational clock when the flag-clear request signal clock is ON;

setting the flag-clear request signal OFF in synchronization with the operational clock when the write-request flag signal is OFF; and setting the internal register-write signal ON in synchronization with the operational clock when the write-request flag signal is OFF.

15. An interface circuit, comprising:
   an arbitration circuit for initiating an internal register-write signal generating cycle in response to a write-request signal, the internal register-write signal generating cycle causing generating and outputting of an internal register-write signal in synchronization with a clock signal supplied from a source of clock signals; and
   an internal register for storing data from a data source in response to the internal register-write signal,
   wherein said arbitration circuit cancels an internal register-write signal generating cycle under execution without outputting the internal register-write signal, upon reception of a second write-request signal.

16. A method of controlling an interface, said method comprising:
   receiving data;
   initiating execution of an internal register-write signal generating cycle upon reception of a write-request signal, said internal register-write signal generating cycle causing generating and outputting of an internal register-write signal in synchronization with an operational clock;
   canceling an internal register-write signal generating cycle under execution without outputting the internal register-write signal, upon reception of a new write-request signal;
   initiating a new internal register-write signal generating cycle in response to the new write-request signal; and
   in response to the internal register-write signal, storing the received data in an internal register.

17. A microcomputer comprising an asynchronous bus, a CPU connected to said asynchronous bus, a macro circuit adapted for operating in synchronization with an operational clock, and an asynchronous bus interface circuit connected to said asynchronous bus and said macro circuit, wherein said asynchronous bus interface circuit comprises:
   an arbitration circuit for initiating an internal register-write signal generating cycle in response to a write-request signal, the internal register-write signal generating cycle causing generating and outputting of an internal register-write signal in synchronization with the operational clock, and canceling of an internal register-write signal generating cycle under execution without outputting the internal register-write signal, upon reception of a second write-request signal, and
   an internal register for storing data output by said CPU in response to the internal register-write signal output by said arbitration circuit, and outputting the data to the macro circuit in synchronization with the operational clock.

18. A microcomputer for being embedded into a target device to be controlled, to control operations of the target device, said embedded microcomputer comprising:
   an asynchronous bus;
   a CPU connected to said asynchronous bus;
   a macro circuit for operating in synchronization with an operational clock and controlling the operations of the target device based on data output by said CPU; and
   an asynchronous bus interface circuit connected to said asynchronous bus and said macro circuit;
   wherein said asynchronous bus interface circuit comprises:
      an arbitration circuit for initiating an internal register-write signal generating cycle in response to a write-request signal, the internal register-write signal generating cycle causing generating and outputting of an internal register-write signal in synchronization with the operational clock, and canceling of an internal register-write signal generating cycle under execution without outputting the internal register-write signal, upon reception of a second write-request signal, and
      an internal register for storing data output from said CPU in response to the internal register-write signal output by said arbitration circuit, and outputting the stored data to said macro circuit in synchronization with the operational clock.

19. A device controlling method employed in a microcomputer comprising an asynchronous bus, a CPU connected to said asynchronous bus, and a macro circuit coupled to said asynchronous bus and operating in synchronization with an operational clock, said method comprising:
   initiating execution of an internal register-write signal generating cycle in response to a write-request signal, said internal register-write signal generating cycle causing generating and outputting of an internal register-write signal in synchronization with the operational clock,
   canceling the internal register write signal generating cycle without outputting the internal register-write signal, in response to a new write request signal;
   initiating execution of a new internal register-write signal generating cycle corresponding to the new write-request signal;
   in response to the internal register-write signal, storing data output from said CPU in an internal register;
   outputting the data stored in said internal register to said macro circuit in synchronization with the operational clock; and
   controlling the target device based on the data received by said macro circuit.

* * * * *